Aug. 4, 1970                B. TERZIC                3,522,481
                  STORAGE BATTERY PROTECTIVE DEVICE
                       Filed March 1, 1968
FIG.1
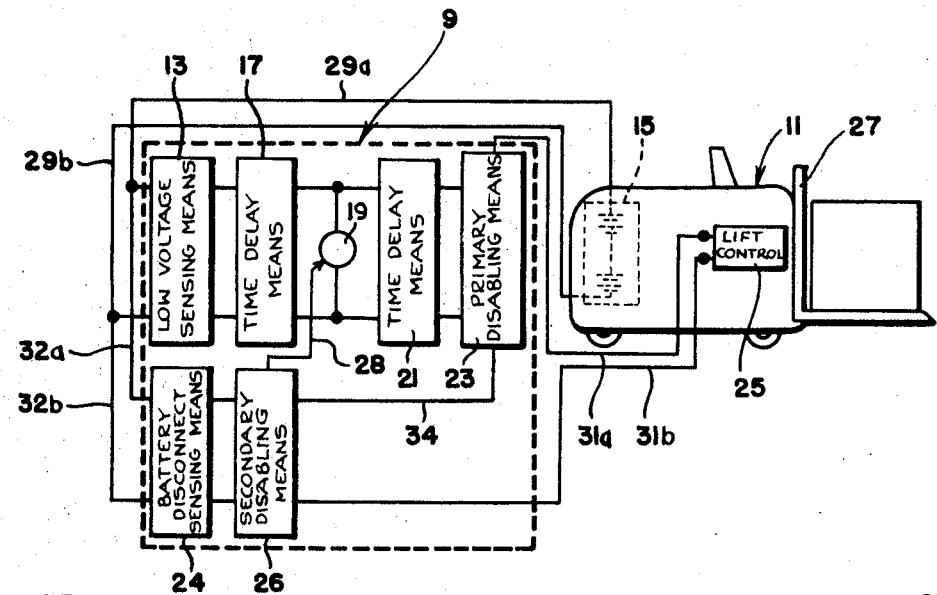
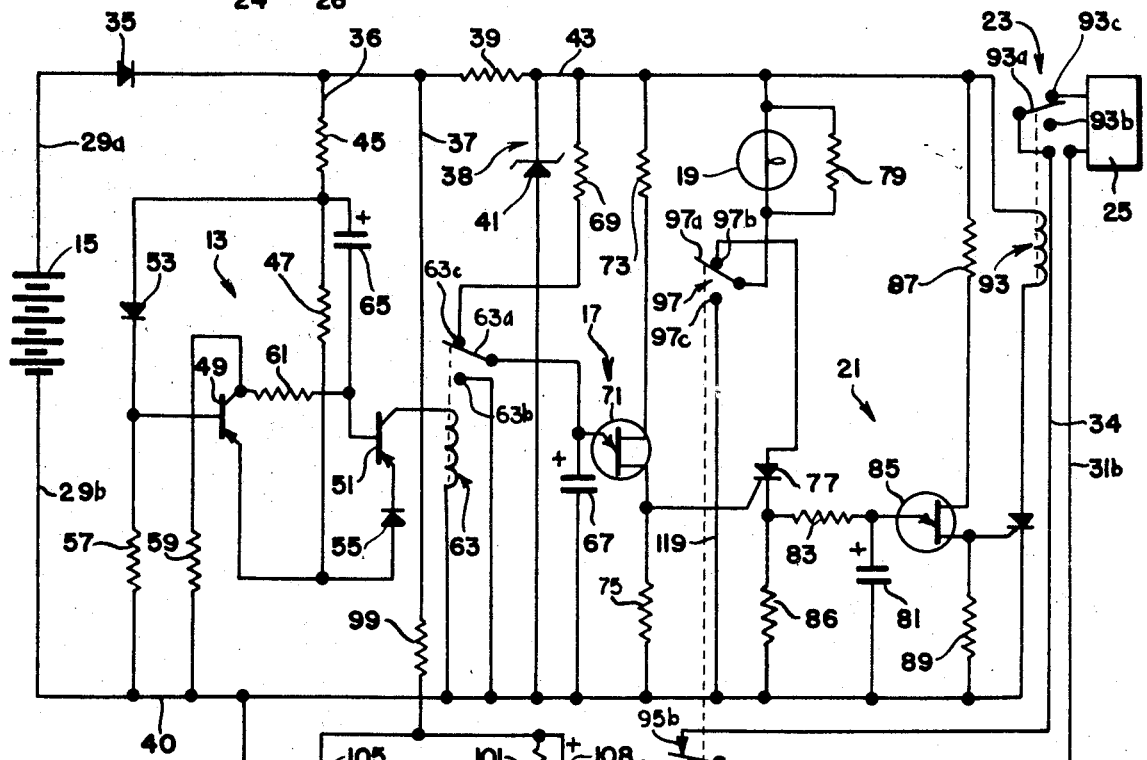
FIG.2
INVENTOR
BRANT TERZIC
Anderson, Luedeka, Fitch, Even, & Tabin
ATTYS.

ns, to KW Battery Company, Skokie, Ill., a corporation of Delaware
Filed Mar. 1, 1968, Ser. No. 709,696
Int. Cl. H02J 3/24
U.S. Cl. 317—31                                                 11 Claims

ABSTRACT OF THE DISCLOSURE

A protective device for use with storage battery-powered apparatus includes a low-voltage sensing means and a battery-disconnect sensing means coupled to the battery. When the battery voltage drops below a first preselected minimum level, the low-voltage sensing means actuates an indicator to inform the operator that the battery has reached a given critical state of discharge. If the condition is not corrected in a predetermined time period, a primary disabling means disables an operational function of the apparatus. If a discharged battery is reconnected to reset the protective device, a secondary disabling means disables the operational function until such time that a charged battery is connected to the apparatus.

---

The present invention relates to a protective device for storage battery-powered apparatus, and more particularly to a protective device for a battery-powered vehicle which prevents over-discharge of the motive-power battery. The present invention is an improvement on the device disclosed in co-pending application Ser. No. 613,860, filed Feb. 3, 1967, now Pat. No. 3,475,061, and assigned to the assignee of the present invention.

Various types of vehicles are powered by storage batteries, and among these, industrial lift trucks are a prime example. In the operation of such vehicles, it is necessary that they be returned to a charging station for recharging of the battery or the substitution of a recharged battery when the storage battery in the vehicle reaches a certain minimum level of discharge to prevent the battery from becoming damaged. Furthermore, the typical vehicle motor which is supplied by such a battery generally will draw more current when the battery voltage is low, and may well exceed the rating of the circuit components associated therewith, thereby resulting in costly damage. Also, should the power suddenly fail without warning, due to the discharged condition, the load being manipulated by the vehicle may be left in a dangerous position and/or the vehicle may require a tow back to the charging station. However, even though these problems and dangers are present, it is often difficult to alert the vehicle operator to the approach of the over-discharged battery condition, and even when the operator is so alerted, it is often extremely difficult to convince him to leave the immediate job he is doing and to return to the charging station for a recharge or a substitute battery.

The problem of convincing the vehicle operator to return to the charging station after being alerted has been generally found to be great, and to require some form of inducement. In order to prevail upon the operator to return to the charging station, the power to the lifting mechanism may be disabled at a predetermined time after the operator has been alerted to the discharged condition of the battery, such alerting being achieved, for example, by a suitable signal lamp on the operating panel of the vehicle or other warning device. However, it has been found that in the specific device disclosed in the aforementioned co-pending application, the operator may reset or recycle the protective device and restore the operability of the lifting mechanism by merely disconnecting the discharged battery and reconnecting it again to the protective device. In addition, it has been found that the protective device may fail to operate when the signal lamp burns out.

It is a general object of the present invention to provide an improved protective device which will prevent over-discharge of a storage battery by requiring discontinuance of use of the discharged battery when the level of discharge reaches a predetermined value.

It is another object of the present invention to provide an improved protective device which provides a warning to the operator when a certain battery discharge condition is reached, so that over-discharge of the storage battery may be avoided, while permitting the continuing operation of the protective device even though the warning device itself should fail.

It is a further object of the present invention to provide an improved protective device for use with a battery-powered industrial lift truck which, upon occurrence of a preselected discharged condition of the battery, indicates the low voltage condition, and at the conclusion of a predetermined time period, disables the lift mechanism so as to necessitate the operator to return to the charging station, while maintaining the lift mechanism in its disabled condition until such time that a charged battery is reconnected to the protective device.

It is still another object of the present invention to provide such an improved protective device wherein only the connection of a fully charged battery will restore the lift mechanism to operating condition after disablement.

These and other objects of the invention are more specifically set forth in the following detailed description and in the accompaying drawings wherein:

FIG. 1 is a diagrammatic view of a protective device embodying various features of the present invention in combination with an industrial lift truck and its motive-power storage battery; and FIG. 2 is an electrical schematic drawing of an embodiment of the protective circuit illustrated in FIG. 1.

Briefly, the protective device 9 illustrated in FIG. 1 is shown in use with a battery powered vehicle 11, such as an industrial lift truck. The protective device 9 includes a low-voltage sensing means 13 which is connected to the terminals of a storage battery 15 of the vehicle so as to sense the voltage of the battery. When the battery voltage drops below a preselected minimum value, which is indicative of a given discharged battery condition, the sensing means 13 energizes a first time delay means 17 which, if the voltage remains below the minimum value for a predetermined period of time, energizes an indicating means 19, such as an incandescent lamp, buzzer, etc. Upon being alerted by the indicating means 19, the operator can then stop his present task and return to the charging station for a recharge or a substitute battery. If the operator does not correct the low voltage condition in a second predetermined time interval, another or second time delay means 21, which is coupled to the first time delay means 17, actuates primary disabling means 23 which disables an operational function of the vehicle, such as the lifting mechanism. Should the operator attempt to reset or recycle the protective device 9 by disconnecting and reconnecting the discharged battery 15, this is detected by battery disconnect sensing means 24 which actuates secondary disabling means 26 to positively prevent the operational function of the vehicle by over-riding the primary disabling means 23, regardless of its condition. The sensing means 24 maintains the operational function disabled unless and until a storage battery having given charged condition greater than the given discharged condition is connected to the protective device. In addition, the secondary disabling means 26 actuates the indicating means 19 by means of the schematically illustrated lead 28 if the discharged battery is reconnected to the protective device.

The battery-disconnect sensing means 24 is responsive to the battery voltage dropping below a preselected minimum voltage less than the minimum voltage threshold of the low voltage sensing means 13, or more particularly, zero volts on disconnection of the battery. However, upon reconnection of the same or a different battery to the protective device, in accordance with the present embodiment of the invention, the battery voltage must be greater than a predetermined threshold level, which level is greater than the preselected minimum voltage required for the initial actuation of the battery-disconnect sensing means, and desirably is sufficiently great to respond only to a fully charged battery.

Although, as shown in FIG. 1, the protective device 9 is employed with the industrial lift truck 11, it may of cours be employed with any storage battery-powered vehicle where it is important to prevent over-discharge of the battery. The truck 11 is depicted as incorporating the storage battery 15 and a control box 25 for operating an electrohydraulic or electromechanical lift mechanism or fork 27, and the protective device 9 is also carried by the truck 11, although for purposes of illustration it is shown separated from the vehicle.

More particularly, the protective device 9 is connected via leads 29a and 29b to the positive and negative terminals, respectively, of the storage battery 15, and via leads 31a and 31b to the lift control circuit 25. Battery-disconnect sensing means 24 is coupled across the battery 15 via leads 32a and 32b which are connected, respectively, to leads 29a and 29b, so as to place the input circuit of the battery-disconnect sensing means 24 in parallel with the input circuit of the low-voltage sensing means 13. The secondary disabling means 26, which is coupled and responsive to the battery-disconnect sensing means 24, is connected in series circuit relation with the primary disabling means 23 and the lift control circuit 25 via leads 34, 31a and 31b.

Referring now to FIG. 2, the potential of battery 15 is applied to the protective device 9 through a polarity-reversal protecting diode 35, shown in forward biased position, in series with the positive terminal of the battery, and a common or reference bus 40 connected to the negative terminal of battery 15. Protecting diode 35 protects the system in the event that the battery is connected with the wrong or opposite polarity to that shown.

The potential of the battery 15 is thus supplied through the diode 35 to the low-voltage sensing means, illustrated in FIG. 2 as circuit 13, and to the battery-disconnect sensing means, illustrated as circuit 24, the inputs of which are both coupled to the cathode of the diode 35 through leads 36 and 37. The cathode of the diode 35 is also coupled to a voltage regulation circuit 38 which includes a voltage-dropping resistor 39 and a Zener diode 41, the anode of which is connected to the negative battery lead 29b through the common return or reference bus 40. The common junction or node of the resistor 39 and the Zener diode 41 provides a regulated voltage on bus 43 for the remaining circuitry of the protective device.

A drop in battery voltage below a preselected minimum level, typically 1.5 volts/cell for a rated 2 volts/cell battery, is sensed by the low-voltage sensing means 13, which may be any circuit providing an actuating output signal when the input voltage thereto is below the preselected minimum and a non-actuating output signal when the input voltage is above the preselected minimum level. The low-voltage sensing means 13, as illustrated in FIG. 2, includes coupling resistors 45 and 47, which couple the battery voltage to the base and emitters, respectively, of switching transistors 49 and 51 through their respective steering diodes 53 and 55, and directly to the emitter of transistor 49. The switching transistors 49 and 51, in the illustrated embodiment of FIG. 2 are of the PNP type and are hereinafter referred to respectively as the input and output transistors of the sensing circuit. Biasing resistors 57 and 59 apply suitable bias potentials to the base and collector, respectively, of input switching transistor 49. The values of the resistors 45, 47, 57 and 59 are chosen so that the emitter-base junction is reverse biased and the input transistor 49 is normally nonconductive or OFF when the battery potential is above the preselected minimum value. At the same time, however, bias resistor 59, in combination with a coupling resistor 61, maintains the emitter-base junction of output switching transistor 51 forward biased so that output transistor 51 is normally conductive or ON when the battery potential is above the preselected minimum value.

More particularly, the bias resistor 59 is connected to the collector of input switching transistor 49 which is normally OFF, and thus in effect, is in series with the coupling resistor 61 connected between the collector of input transistor 49 and the base of transistor 51 to apply a potential derived from the negative battery terminal to the base of output switching transistor 51, while a more positive potential is applied to the emitter through steering diode 55. The collector of output transistor 51 is negatively biased through the winding of sensing means output relay 63, which is thus, in its energized condition in normal operation, having the armature or movable contact 63a engaged with the stationary contact 63b. A trigger capacitor 65 is coupled between the junction of coupling resistors 45 and 47 and the base of output transistor 51, and has a voltage thereon of a polarity as shown in FIG. 2. The trigger capacitor 65 maintains the sensing circuit 13 in this state until the battery potential falls below the preselected minimum value, at which time the sensing circuit 13 switches to its opposite state wherein input transistor 49 is conductive or ON and output transistor 51 is nonconductive or OFF.

More specifically, when the battery voltage decreases, the base-emitter junction of input transistor 49 moves toward cut-off or nonconduction due to the decreasing voltages across coupling resistors 45 and 47. The charge on trigger capacitor 65 discharges and holds the circuit in its previous state until the applied battery potential decreases to the preselected minimum value, whereat each of the switching transistors abruptly change their state, the increase in collector voltage of input transistor 49, raising the base potential of output transistor 51 and thus cutting-off the collector current thereof.

When output transistor 51 becomes nonconductive, sensing means output relay 63 is de-energized, permitting the armature contact 63a to return to its normal position in contact with the stationary contact 63c (i.e., the position illustrated). Once the circuit has switched to this state, it will remain in this state even though the battery voltage may increase somewhat; for example, the circuit may retain this state even though the battery voltage may rise to typically just under 1.95 volts/cell. This occurs due to hysteresis characteristic of the switching circuit.

The sensing means output relay 63 forms a part of the low-voltage sensing means 13 and provides an output signal to either actuate or deactuate the time delay means 17. With the armature contact 63a of relay 63 engaged with stationary contact 63c, timing capacitor 67 begins to charge through series resistor 69 coupled from the reference bus 43 to one side of the capacitor 67, the other side of which is connected to the negative side of battery 15 via common lead 40. The values of series resistor 69 and timing capacitor 67 are chosen so that the series combination has a time constant that provides a voltage build-up across the timing capacitor 67 which is sufficient to trigger a unijunction transistor 71 in a predetermined time which is of sufficient length to discriminate between a momentary or temporary decrease in battery potential (such as those that may be caused by excessive loading of the vehicle, lift-forks, etc.) and a decrease in battery potential which remains for some longer duration caused by the discharged condition of the battery. A time interval of about three minutes has been found to be generally satisfactory for this purpose.

If the state of the low-voltage sensing circuit 13 returns to its original state due to a rise in battery potential above the hysteresis threshold before the unijunction transistor 71 fires, the relay 63 becomes energized and discharges the timing capacitor 67 through armature 63a and contact 63b which are then in engagement. This deactuates the time delay circuit 17.

The time delay unijunction transistor 71 is connected between the reference voltage bus 43 and the common lead 40 by means of bias resistor 73 and output resistor 75. When the unijunction transistor 71 becomes conductive, current flowing therethrough produces an abrupt trigger pulse or spike across output resistor 75 which is applied to the control electrode of a silicon controlled rectifier (SCR) 77.

The SCR 77 is responsive to the trigger pulse from the time delay unijunction transistor 71 and actuates the indicating means 19 and the second time delay means 21. The anode of the SCR 77 has a positive potential applied thereto by means of the indicating means 19, shown as an incandescent lamp, and a parallel connected protective resistor 79, so that it becomes conductive upon triggering, causing timing capacitor 81 to charge through timing resistor 83. Contacts 97a and 97b, the function of which will be described hereinafter, are connected in series between the anode of the SCR 77 and the parallel combination of lamp 19 and protective resistor 79, and are closed in normal operation. The values of timing resistor 83 and timing capacitor 81 are chosen so as to provide a time constant whereby the voltage across the timing capacitor 81 will be sufficient to trigger a second time delay unijunction transistor 85 after a second predetermined time period, which may also be typically three minutes. This period of time is provided before disablement of the lift mechanism so that the operator may return to the charging station or obtain a new or charged battery after he is alerted to the fact that the battery of his vehicle has reached the dangerous state of discharge. When the discharged battery is disconnected during the second predetermined time period, the timing capacitor 81 discharges through timing resistor 83 and output resistor 86.

In a manner similar to the first time delay means 17, the second time delay unijunction transistor 85 is coupled to the reference voltage bus 43 and the common lead 40 by means of bias resistor 87 and output resistor 89. When the second time delay unijunction transistor 85 becomes conductive, a trigger pulse is provided across output resistor 89 to an output silicon controlled rectifier (SCR) 91. The output SCR 91, when triggered, actuates the primary disabling means 23 to disable the lift mechanism of the vehicle after the second predetermined time period has elapsed.

The primary disabling means 23 includes an output relay 93 having the coil or winding thereof in series with the output SCR 91 so that when the output SCR 91 is conductive, the disabling means relay 93 is energized. More particularly, the coil of relay 93 is connected between the voltage reference bus 43 and the anode of the output SCR 91, the cathode being connected directly to common lead 40. Primary disabling means output relay 93 has its armature contact 93a normally in engagement with stationary contact 93c (the illustrated position in FIG. 2) when it is unenergized. This position of the armature contact 63a enables the lift control circuitry 25 by providing a closed circuit path thereto. However, when the output relay 93 is energized, the armature is actuated to engage the stationary contact 93b, opening the circuit of the lift control mechanism 25 and disabling the same.

The contacts of relay 93, forming a part of the primary disabling means 23, are connected in series with the secondary disabling means 26, which includes secondary output relay 95 having normally open contacts 95a and 95b maintained in an engaged or closed position due to the energization of relay 95 during normal operation when the battery potential is above the preselected minimum level of the battery-disconnect sensing means circuit 24. Both the contacts of relay 93 and the relay 95 are in series with the lift control 25 through leads 31b and 34, and consequently, if either one or the other is in an open-circuit condition, the lift mechanism will be disabled.

The battery-disconnect sensing means, illustrated in FIG. 2 as circuit 24, is similar to the circuit employed for the low-voltage sensing means 13, but may be any type of circuit or device which provides the function of maintaining the lift control in its enabled condition except when the battery voltage drops below a second preselected minimum level set by the sensing means 24 to indicate that the battery has been disconnected, and to provide an output which maintains the lift control in the disabled condition if a discharged battery is reconnected. The battery-disconnect sensing means 24 has a switching characteristic such that it maintains the secondary disabling means 26 in the enable condition even though the battery voltage may decrease below the preselected minimum value of the low-voltage sensing means 13; such as for example, down to about one volt per cell. However, if the battery voltage drops below the second preselected minimum level of the battery-disconnect means 24, such as below one volt per cell, or more specifically, if the battery plug is disconnected so that zero or no voltage is supplied to the circuit, the secondary disabling means 26 is actuated, disabling the lift control 25 through leads 31b and 34. However, after the battery-disconnect sensing means circuit 24 has changed its state to actuate the secondary disabling means 26, a fully charged battery, i.e., one that produces for example two volts per cell, is required to return the state of the circuit to that previously existing to enable the lift control and permit normal operation of the vehicle. Additional switching means is provided, illustrated as auxiliary contacts 97 of the secondary output relay 95, to immediately energize the signal lamp 19 when a discharged battery is reconnected to the protective device.

More particularly, the battery-disconnect sensing circuit 24 has the battery potential applied thereto from the cathode of the polarity-reversal protecting diode 35 through lead 37 and coupling resistors 99 and 101. This battery potential is applied to the base of input switching transistor 103 through steering diode 105, and to the emitters of input and output transistors 103 and 107 through the coupling resistor 101, the emitter of the output transistor 107 being fed through a steering diode 109. Both transistors 103 and 107 in the illustrated embodiment are of the PNP type. Biasing resistors 111 and 113 provide suitable operating potentials on the base and collector, respectively, of input transistor 103 so that it is normally nonconductive or OFF. The output transistor 107 has its base-emitter junction forward biased by the biasing resistor 113 and a coupling resistor 115 connected between the collector of input transistor 103 and the base of output transistor 107. A trigger capacitor 108 is connected between the junction of coupling resistors 99 and 101 and the base of output transistor 107 to establish a threshold switching characteristic for the circuit.

As previously mentioned, secondary disabling means 26 includes secondary output relay 95 which has its coil serially connected in the collector circuit of output transistor 107. Thus, output relay 95 of the secondary disabling means 26 is normally energized by the collector current of output transistor 107 when the battery potential is above the preselected minimum level of battery disconnect sensing means 24. In this condition, the relay contacts 95a and 95b are maintained in engagement and the auxiliary relay contact set 97 is maintained with the armature 97a in contact with the stationary contact 97b.

Should the battery 15 be disconnected so that the voltage to the protective device drops, for example, under one volt per cell or zero, input transistor 103 becomes conductive and output transistor 107 becomes nonconductive, in the manner previously described in connection with the low-voltage sensing circuit 13, de-energizing the secondary output relay 95, and opening the contacts 95a and 95b to disable the lift control 25. If an attempt is made to reconnect the discharged battery to the protective device, the lift control 25 will remain disabled even though the battery voltage may be somewhat higher than the one volt per cell because of the hysteresis characteristic of the circuit. It will continue to maintain the secondary output relay 95 in its de-energized condition until a fully charged battery having, for example, two volts per cell, is connected to the protective device.

Reconnection of the discharged battery, will, however, immediately cause the signal lamp 19 to light, since the de-energization of relay 95 causes the contacts 97a and 97c to close, completing the lamp circuit from the reference voltage bus 43 to the common lead 40.

The protective resistor 79 is provided in parallel with the lamp 19 so that in event of a lamp failure, the protective device 9 will continue to operate, and after the elapsed time equal to the first predetermined time interval and the second predetermined time interval, or typically about six minutes, the primary disabling means will disable the lift control, even though no lamp or warning indication was provided. This occurrence will indicate the fact that the warning device or lamp is not functioning. The auxiliary circuit for lighting the lamp 19 on the reconnection of a discharged battery is provided with less series resistance than the alternate path through the SCR 77 and resistance 86 so that it is connected directly to the common lead 40 by means of lead 119 in order to provide sufficient voltage across the lamp 19 to light the same even though a discharged battery of very low voltage has been reconnected to the system.

With respect to the resetting capability of the protective device 9, if the drop in battery voltage to below the preselected minimum level of low-voltage sensing means 13, such as a drop to 1.5 volts/cell, is merely due to the loading of the vehicle, etc., and thus resumes a greater voltage of, for example, 1.95 volts/cell or greater in less than the predetermined time required for firing of the first time delay unijunction transistor 71 (and before the lamp 19 is lighted), the actuating-deactuating relay 63 will become energized, closing the contacts 63a and 63b to discharge the timing capacitor 67. Thus, the protective device 9 does not provide the possibility of permitting the accumulation of a number of instances of temporary reduced voltages to be treated as a discharge battery condition. The charge build-up on timing capacitor 67 for firing time delay unijunction transistor 71 begins substantially from zero each time the battery potential drops below the preselected low voltage level of the circuit 13.

Likewise, after the energization of lamp 19 and before the second predetermined time period has elapsed, on disconnecting the discharged battery, the timing capacitor 81 will discharge through the resistors 83 and 86. Therefore, on reconnection of the fully charged battery (the only way that the secondary disabling means 26 will enable the lift control), the operation of the protective device upon subsequent discharge of this battery to the critical or dangerous discharge level will not be affected by the previous history of the second time delay means 21.

Various modifications of the present invention will become apparent to those skilled in the art; and accordingly, the scope of the present invention should be defined only by the claims, and equivalents thereof.

Various features of the invention are set forth in the following claims.

What is claimed is:

1. A protective device for use with storage battery-powered apparatus comprising low-voltage sensing means for sensing a decrease in the storage battery voltage below a first preselected minimum level indicative of a given discharged battery condition, delay means responsive to said low-voltage sensing means for providing an output signal indicative of said given discharged condition at a predetermined time after its occurrence, primary disabling means for disabling an operational function of the apparatus in response to the output of said time delay means, further sensing means for sensing a decrease in the storage battery voltage below a second preselected minimum voltage level, and secondary disabling means responsive to said further sensing means for maintaining said operational function in a disabled condition unless and until a storage battery having a given charged condition greater than said given discharged condition is connected to the protective device.

2. A protective device in accordance with claim 1 wherein said second preselective minimum voltage level is less than said first preselected minimum voltage level.

3. A protective device in accordance with claim 1 further comprising indicating means responsive to said further sensing means for indicating the reconnection of a battery having less than said given charged condition to the protetcive device.

4. A protective device in accordance with claim 1 comprising indicating means responsive to said low-voltage sensing means for indicating said given discharged battery condition prior to the operation of said disabling means.

5. A protective device in accordance with claim 4 comprising means for maintaining the operability of the protective device for disablement of said operational function of the apparatus should said indicating means fail to operate.

6. A protective device in accordance with claim 1 wherein said time delay means includes a first time delay means responsive to said low-voltage sensing means, indicating means responsive to said first time delay means to indicate said given discharged battery condition after a first predetermined time period, and a second time delay means actuated by said first time delay means for actuating said disabling means after a second predetermined time period.

7. A protective device in accordance with claim 6 wherein said low-voltage sensing means resets said first delay means when the battery voltage is below the first preselected minimum level for a time less than said first predetermined time period.

8. A protective device in accordance with claim 1 wherein said further sensing means is responsive only to a battery voltage higher than a given threshold for enabling said operational function of the apparatus, said threshold being higher than said first or second preselected minimum voltage levels.

9. A protective device in accordance with claim 1 wherein said primary and secondary disabling means are serially connected for disabling the operational function of the apparatus by the operation of either.

10. In combination with an electric-powered lift vehicle, a motive-power storage battery, and a lift mechanism, a protective device comprising low-voltage sensing means coupled to the battery for sensing a decrease in the battery voltage below a first preselected minimum level, indicating means connected to said low-voltage sensing means for indicating said low voltage condition, primary means for disabling said lift mechanism to prevent subsequent lifting of a workload, first time delay means connected between said sensing means and said indicating means to delay for a predetermined time after actuation of said low-voltage sensing means the actuation of said indicating means, second time delay means connected between said indicating means and said primary disabling means for providing a predetermined time delay before actuation of said disabling means after actuation of said indicating means, battery-disconnect sensing means also coupled to the battery for sensing a decrease in the battery voltage below a second predetermined minimum level less than said first level, and secondary disabling means connected to said battery-disconnect sensing means for disabling said lift mechanism upon actuation of said battery-disconnect sensing means and for enabling said lift mechanism only when the battery voltage is greater than a predetermined threshold voltage of said battery-disconnect sensing means, said threshold voltage corresponding to the approximate voltage of a charged battery.

11. The combination of claim 10 further comprising means coupled to said indicating means for actuation thereof in the event that a battery having a voltage lower than said threshold voltage is connected to said protective device.

References Cited

UNITED STATES PATENTS

| | | | |
|---|---|---|---|
| 3,343,036 | 9/1967 | Steen | 317—31 |
| 3,389,325 | 6/1968 | Gilbert | 317—31 X |
| 3,447,060 | 5/1969 | Tedd | 320—40 X |

JAMES D. TRAMMELL, Primary Examiner

U.S. Cl. X.R.

377—33, 36; 320—40; 340—249; 307—94, 130